United States Patent [19]

D'Erasmo

[11] Patent Number: 4,674,404
[45] Date of Patent: Jun. 23, 1987

[54] BAGEL PRESS

[76] Inventor: Lawrence D'Erasmo, 55 Mosholu Pkwy., Bronx, N.Y. 10567

[21] Appl. No.: 852,644

[22] Filed: Apr. 16, 1986

[51] Int. Cl.[4] .............................................. B30B 7/02
[52] U.S. Cl. ..................................... 100/234; D7/43; D7/101
[58] Field of Search ....................... 100/233, 234, 235; D7/43, 99, 101, 105

[56] References Cited

U.S. PATENT DOCUMENTS

| D. 155,422 | 10/1949 | Henderson | D7/43 |
| 1,996,970 | 4/1935 | Morris | 100/234 X |
| 2,173,760 | 9/1939 | Moran | D7/43 X |
| 3,347,296 | 10/1967 | Rothman | D7/43 X |

*Primary Examiner*—Peter Feldman
*Attorney, Agent, or Firm*—Arthur T. Fattibene

[57] ABSTRACT

A press for pressing sliced bagels that includes a pair of readily separable members, one of which is a base member having a dish shape portion defining a seat for a sliced bagel. The other member is a pressure plate which is hingedly connected about a hinge pivot mounted on the base member. The hinging arrangement between the base plate and pressure plate is such that the respective plates can be readily assembled and disassembled.

1 Claim, 4 Drawing Figures

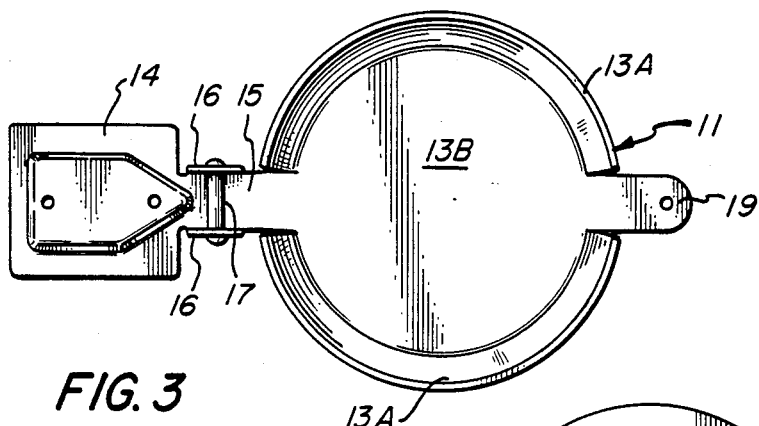
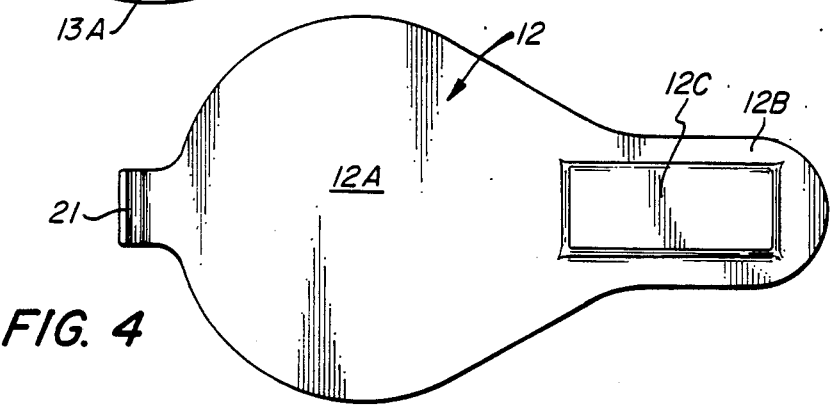
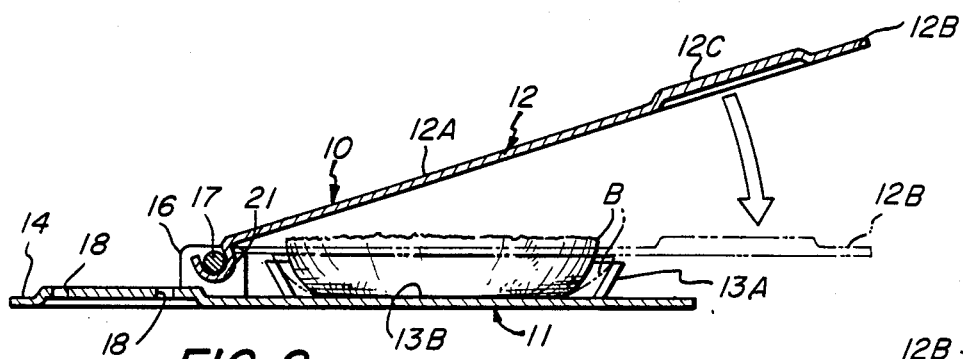
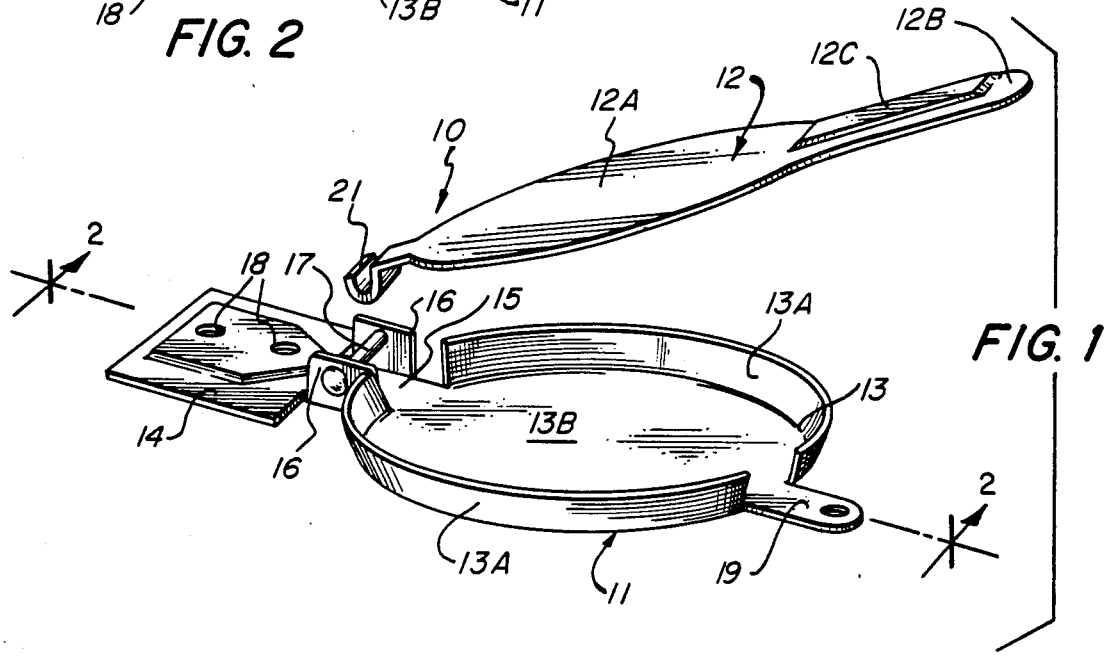

BAGEL PRESS

FIELD OF INVENTION

This application is directed to a bagel process whereby conventionally sliced bagel can be flattened in a sanitary manner to a size which allows it to be received in a toasting slot of a toaster.

PROBLEM AND PRIOR ART

A bagel is a relatively popular type of a bread product having a well known donut shape configuration which is generally sliced and toasted. It has been observed that the thickness of a conventional bagel is such that it cannot be conveniently fitted into a toasting slot of a conventional toaster. For this reason, a sliced bagel must be flattened before it can be received in the toasting slot of a conventional toaster. Heretofore, the sliced bagel was usually flattened by squeezing the same between the palms of one's hand. Such practice is highly unsanitary and unappetizing. The problem is particularly aggravated in commercial establishments that serve a relatively great number of toasted bagels.

OBJECTS

An object of this invention is to provide a device whereby a sliced bagel can be readily flattened in a sanitary manner.

Another object is to provide a bagel press which is relatively simple in construction, inexpensive to manufacture and which is positive in operation.

Another object is to provide a bagel press which can be readily assembled and disassembled without the need of any tools.

SUMMARY OF THE INVENTION

The foregoing objects and other features and advantages are attained by a bagel press formed of a pair of complementary members, one of which defines a base member having integrally formed thereon a seat portion shaped to receive a sliced bagel and a complementary mounting portion arranged for accommodating a hinge pin. The other member comprises an essentially flat pressure plate having a hinged construction for detachably hingedly securing the pressure plate to the base plate, whereby the bagel slice can be readily flattened by squeezing the bagel between the respective plates.

FEATURES

A feature of this invention residues in the provision whereby the respective complementary members are formed as integral members which can be readily mated to hinge between operative and inoperative positions.

Another feature resides in the provision whereby the complementary members can be readily assembled and disassembled without the need of any tools.

Another feature residues in the provision whereby the press can be readily cleaned and sanitized.

Other features and advantages will become more readily apparent when considered in view of the drawings and description in which:

FIG. 1 is a perspective exploded view of a bagel press embodying the invention.

FIG. 2 is a side sectional view of the bagel press taken along line 2—2 on FIG. 1.

FIG. 3 is a detail top plan view of the base member of the bagel press.

FIG. 4 is a detail plan view of the pressure plate.

DETAIL DESCRIPTION

Referring to the drawings, FIGS. 1 and 2 illustrate the bagel press 10 of the present invention. The illustrated embodiment includes a pair of complementary members comprising a base plate 11 and a complementary pressure plate 12.

The base plate 11 includes a dish shaped portion 13 shaped to define a seat for receiving a sliced bagel B. As shown, the seat or dish shaped portion is defined by a pair of opposed wall portions 13A, 13A that extend in a generally upward and outward direction relative to the bottom portion 13B of the dish shaped portion 13. Connected to the dish shaped portion at one end thereof is a mounting portion 14 which is connected by a web or neck 15 to the bottom portion 13B of the bagel seat 13.

Connected to the web or neck 15 are a pair of opposed flanges 16, 16 which are blanked out of the neck 15 and disposed normal thereto. Supported on and between the flanges 16, 16 is a hinge pin 17 which is spaced above the neck or web 15. The mounting portion, if desired, is provided with one or more apertures 18 whereby the base plate 12 can be secured to a supporting surface or counter by suitable fasteners, not shown. Connected to the opposite end portion of the bagel seat 13 is a mounting tab 19 to define a further means by which the base plate 11 may be securely anchored to a counter or supporting surface with a fastener.

In accordance with this invention, the pressure plate 12 is detachably hinged about the hinge pin 17. This is attained by a hinge strap 21 formed adjacent one end of the pressure plate 12. As best seen in FIGS. 1 and 2, the hinge strap or portion 21 comprises a projecting tab which is reversely bent so as to be open at one end which can be freely inserted between the web 15 and the hinge pin 17 so that the hinge pin 17 is cradled within the reversely bent hinge strap or portion 21. As is evident in FIG. 2, the pressure plate can be readily pivoted about the hinge pin 17 between operative and inoperative positions.

Projecting beyond the pressure portion 12A of the pressure plate is a handle projection 12B. To reinforce the handle, a portion thereof is recessed or indented out of the plane of the handle for added rigidity; as shown in 12C.

As shown in FIG. 2, the height of the wall portion 13A defining the bagel seat 13 is slightly less than the height of a normally sliced bagel B. Also, the periphery of the dish shaped seat is slightly greater than the bagel B so as to allow for some expansion of the bagel when it is squeezed between the pressure plate 12 and the base plate 11 to flatten the same.

From the foregoing, it will be readily apparent that the bagel can be mechanically flattened in a sanitary manner so that it can be received within the toasting slot of a toaster. The press 10 may be formed of suitable metal or rigid plastic which can be readily stamped or molded.

While the invention has been described with respect to a particular embodiment, it will be apparent that variations and modifications may be made without departing from the spirit or scope of the invention.

What is claimed is:

1. A bagel press comprising:
a pair of complementary members, one of said members forming a base plate of generally circular configuration, a neck tab projecting laterally from said base plate, a mounting tab connected to said base plate, said mounting tab being diametrically opposed to said neck tab and projecting outwardly from said base plate, opposed wall portions integrally connected to said base plate, said wall portions extending in a generally upwardly and outwardly direction relative to said base plate, and circumscribing the peripheral portion of said base plate between said neck tab and said mounting tab to define a seat to receive a sliced bagel, said mounting tab and neck tab being blanked out of the material of said opposed wall portions, said wall portions having a height which is less than that of a normally sliced bagel, opposed flanges connected to and disposed normal to said neck tab, a hinge pin supported between said opposed flanges, said hinge pin being spaced above said neck tab, and the other of said complementary member including a pressure plate, said pressure plate comprising a flat imperferate plate, a hing strap connected to an projecting from said pressure plate, said hinge strap being reversely bent so as to define an open U-shaped hinge whereby it can be freely inserted between the hinge pin and said neck tab to cradle the hinge pin so that the pressure plate can readily pivot between operative and inoperative position about said hinge pin, and yet render the pressure plate readily detachable from said base plate, a handle connected to said pressure plate and extending forwardly thereof, and a mounting portion connected to and extending outwardly of said neck tab, said mounting portion and said mounting tab being oppositely disposed, and apertures fromed in said mouting portion and mounting tab adapted for receiving a fastener for securing said base plate to a supporting surface.

* * * * *